(12) United States Patent
Innocenti

(10) Patent No.: US 9,890,791 B2
(45) Date of Patent: Feb. 13, 2018

(54) VENTILATION ASSEMBLY

(71) Applicant: Johnson Electric S.A., Murten (CH)

(72) Inventor: Piergiorgio Innocenti, Asti (IT)

(73) Assignee: JOHNSON ELECTRIC S.A., Murten (CH)

( * ) Notice: Subject to any disclaimer, the term of this patent is extended or adjusted under 35 U.S.C. 154(b) by 550 days.

(21) Appl. No.: 14/506,012

(22) Filed: Oct. 3, 2014

(65) Prior Publication Data
US 2015/0098817 A1  Apr. 9, 2015

(30) Foreign Application Priority Data

Oct. 4, 2013  (IT) .............................. TO2013A0806

(51) Int. Cl.
| F04D 29/40 | (2006.01) |
| F04D 29/54 | (2006.01) |
| F04D 29/66 | (2006.01) |
| F04D 19/00 | (2006.01) |
| B60K 11/00 | (2006.01) |

(52) U.S. Cl.
CPC ............ F04D 29/403 (2013.01); B60K 11/00 (2013.01); F04D 19/002 (2013.01); F04D 29/545 (2013.01); F04D 29/663 (2013.01)

(58) Field of Classification Search
CPC .... F04D 19/002; F04D 29/326; F04D 29/403; F04D 29/522; F04D 29/547; F04D 29/663; F04D 29/667; F04D 29/54; F04D 29/541; F04D 29/545; B60K 11/00
USPC ............................................... 416/169 R, 189
See application file for complete search history.

(56) References Cited

U.S. PATENT DOCUMENTS

| 4,566,852 A * | 1/1986 | Hauser ................. B01D 53/005 |
| | | 415/220 |
| 5,249,927 A * | 10/1993 | Vera ....................... F04D 29/325 |
| | | 415/228 |
| 2015/0260200 A1* | 9/2015 | Dreesen ................ F04D 29/164 |
| | | 415/220 |

\* cited by examiner

*Primary Examiner* — Ninh H Nguyen
*Assistant Examiner* — Brian P Wolcott
(74) *Attorney, Agent, or Firm* — Muncy, Geissler, Olds & Lowe, P.C.

(57) ABSTRACT

A ventilation assembly, particularly for a vehicle, has a cowl with a conduit for air flow. The conduit has a first portion and a second portion having a smaller diameter and a joining portion joining the first and second portions. A fan is disposed in the conduit. The fan has an impeller with a peripheral ring having a lip. An annular passage is formed between the ring and the conduit. The lip has a substantially frusto-conical shape; and the joining portion of the conduit has a substantially frusto-conical shape, with an inclination angle ($\alpha$) at least approximately corresponding to that of the lip of the impeller. The inclination angle ($\alpha$) is between 115° and 145°.

14 Claims, 4 Drawing Sheets

VENTILATION ASSEMBLY

CROSS REFERENCE TO RELATED APPLICATIONS

This non-provisional patent application claims priority under 35 U.S.C. § 119(a) from Patent Application No. TO2013A000806 filed in Italy on Oct. 4, 2013, the entire contents of which are hereby incorporated by reference.

FIELD OF THE INVENTION

This invention relates to a ventilation assembly, especially for a heat exchanger of a motor vehicle and in particular, to a ventilation assembly having an anti-recirculation feature.

BACKGROUND OF THE INVENTION

More specifically, the invention relates to a ventilation assembly of the type comprising: a support structure or cowl in which there is defined a conduit having at least first and second axial portions with a larger and a smaller cross-section, respectively, interconnected by an intermediate joining portion, and a motor-driven fan including an impeller mounted rotatable in said conduit and comprising a plurality of blades which extend between a central hub and a peripheral ring. The peripheral ring has an essentially cylindrical main portion to which the radially outer ends of the blades are connected and to which an outwardly diverging end lip is joined. The arrangement being such that between the peripheral ring of the impeller and the wall of the conduit of the support structure or cowl there is defined an annular passage. The annular passage has a first portion defined between the lip of the peripheral ring of the impeller and said joining portion of the conduit and extending in a direction having a radial component, and an essentially axial second portion defined between the cylindrical portion of the peripheral ring of the impeller and the second portion of said conduit.

Ventilation assemblies of this type, according to the prior art, are partially and schematically shown in cross-section in FIGS. 1a to 1d of the accompanying drawings. In these figures the support structure or cowl intended to be fixed to a heat exchanger is indicated by 1, and the impeller of the associated motor-driven fan is denoted overall by 2. The conduit 3 formed in the cowl 1 has two portions 3a and 3b with a larger and a smaller cross-section, respectively, interconnected by an intermediate joining portion 3c (see for example FIGS. 1a and 1b).

The impeller 2 comprises a central hub 4 from which there extends a plurality of blades 5, the radially outer ends of which are connected to a peripheral ring indicated by 6. This ring has an essentially cylindrical main portion 6a to which the blades 5 are connected and to which a radially outwardly diverging end lip 6b is joined. The annular passage defined between the conduit 3 and the ring 6 is denoted by 7.

In the variant according to FIG. 1a the lip 6b of the ring 6 of the impeller extends approximately in the same general plane as the cowl 1, while in the embodiment according to FIG. 1b the lip 6b is set back with respect to said general plane and extends inside the first portion 3a of the conduit 3.

In the variant according to FIG. 1c, the lip 6b of the ring 6 of the impeller extends beyond the conduit 3, at a given distance from the general plane of the cowl 1.

Finally, in the variant according to FIG. 1d, the impeller 2 is positioned, relative to the cowl 1 and to the conduit 3, substantially as in FIG. 1b, but the cowl 1 has an associated anti-recirculation ring 9, known also as an acoustic ring, which extends radially towards the axis of the impeller and is partly facing and in some cases curved towards the impeller 2.

Typically the cowl 1 and the impeller are made of thermoplastic polymers, by means of molding, and their design requires particular attention aimed at reconciling the need for a reduction in weight with that of an acceptable rigidity. The impellers are components which are highly stressed dynamically during operation and their deformations and movements must be suitably taken into consideration in order to avoid contact with stationary parts. For these reasons the gaps between the various parts must be suitably sized. These gaps, which for safety reasons are over-sized, are negatively compensated for in terms of flow rate and pressure of the air flow generated, with an increase in noise, increased electrical power consumption and reduced operating efficiency.

SUMMARY OF THE INVENTION

Hence there is a desire for a ventilation assembly of the initially defined type which is able to improve the performance features of the solutions according to the prior art, in particular as regards the reduction in the recirculating flows and the noise, reduction in the electrical power consumption and improvement in the overall efficiency.

This is achieved, according to the invention, with a ventilation assembly of the type initially defined, characterized primarily in that the lip of the peripheral ring of the impeller has a substantially frusto-conical shape, with an inclination angle between 115° and 145°, and the joining portion of the aforesaid conduit also has a substantially frusto-conical shape, with an inclination angle at least approximately corresponding to that of the lip of the impeller.

According to a further characteristic feature, the lip of the peripheral ring of the impeller has a frusto-conical outer surface having a linear profile, and an inner surface having a convex profile, in particular a parabolic profile.

In one embodiment the support structure or cowl has an associated anti-recirculation ring which extends at the end of the first portion of the aforesaid conduit opposite to the second portion of said conduit. This anti-recirculation ring faces the lip of the peripheral ring of the impeller, and converges towards the impeller, with an inclination angle at least similar to that of the lip of the impeller.

Conveniently, in the annular passage defined between the peripheral ring of the impeller and the conduit of the cowl there is provided an annular projection, which extends from the joining zone between the anti-recirculation ring and the first portion of the aforesaid conduit, towards the lip of the peripheral ring of the impeller, defining a local narrowing in the annular passage.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1A:
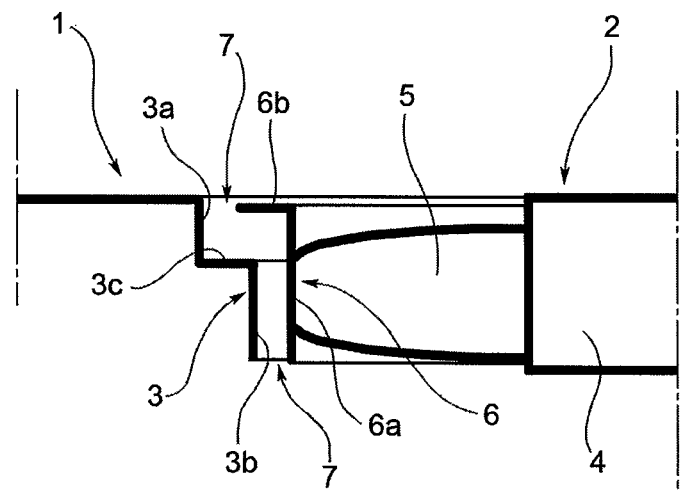
FIGS. 1a to 1d, already described, are partial cross-sectional views which show in diagrammatic form solutions according to the prior art.
Figure 1B:
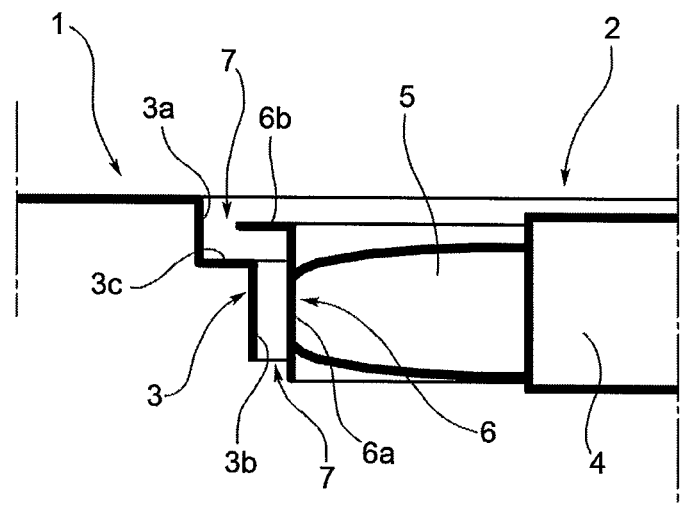
Figure 1C:
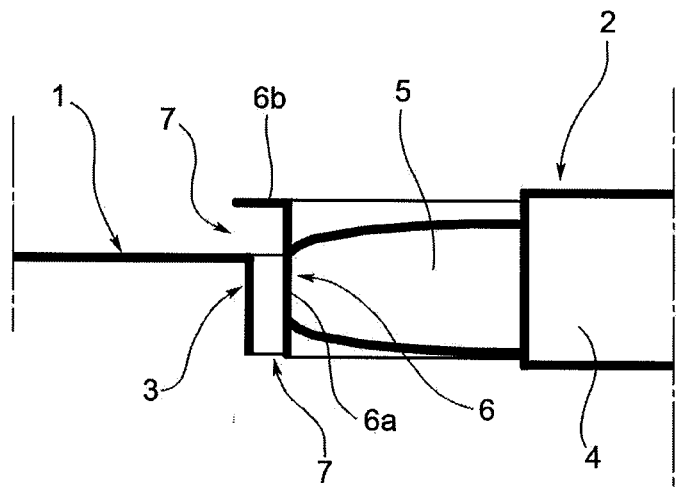
Figure 1D:
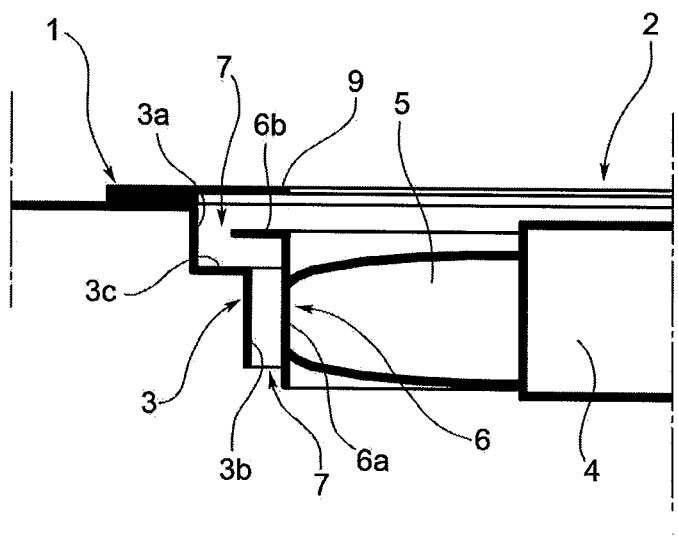
Figure 2:
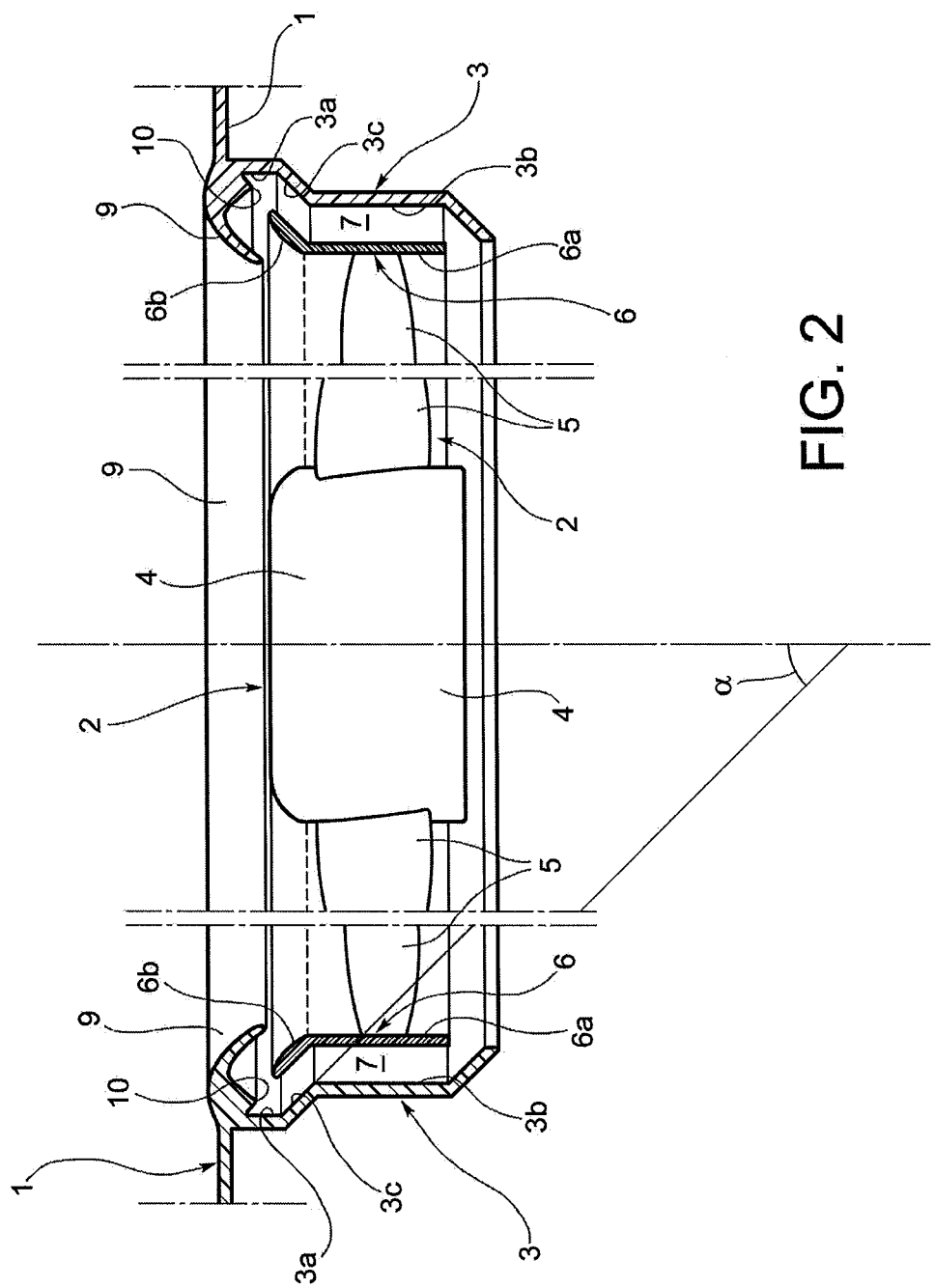
FIG. 2 is a partial cross-sectional view of a ventilation assembly according to the present invention.
Figure 3:
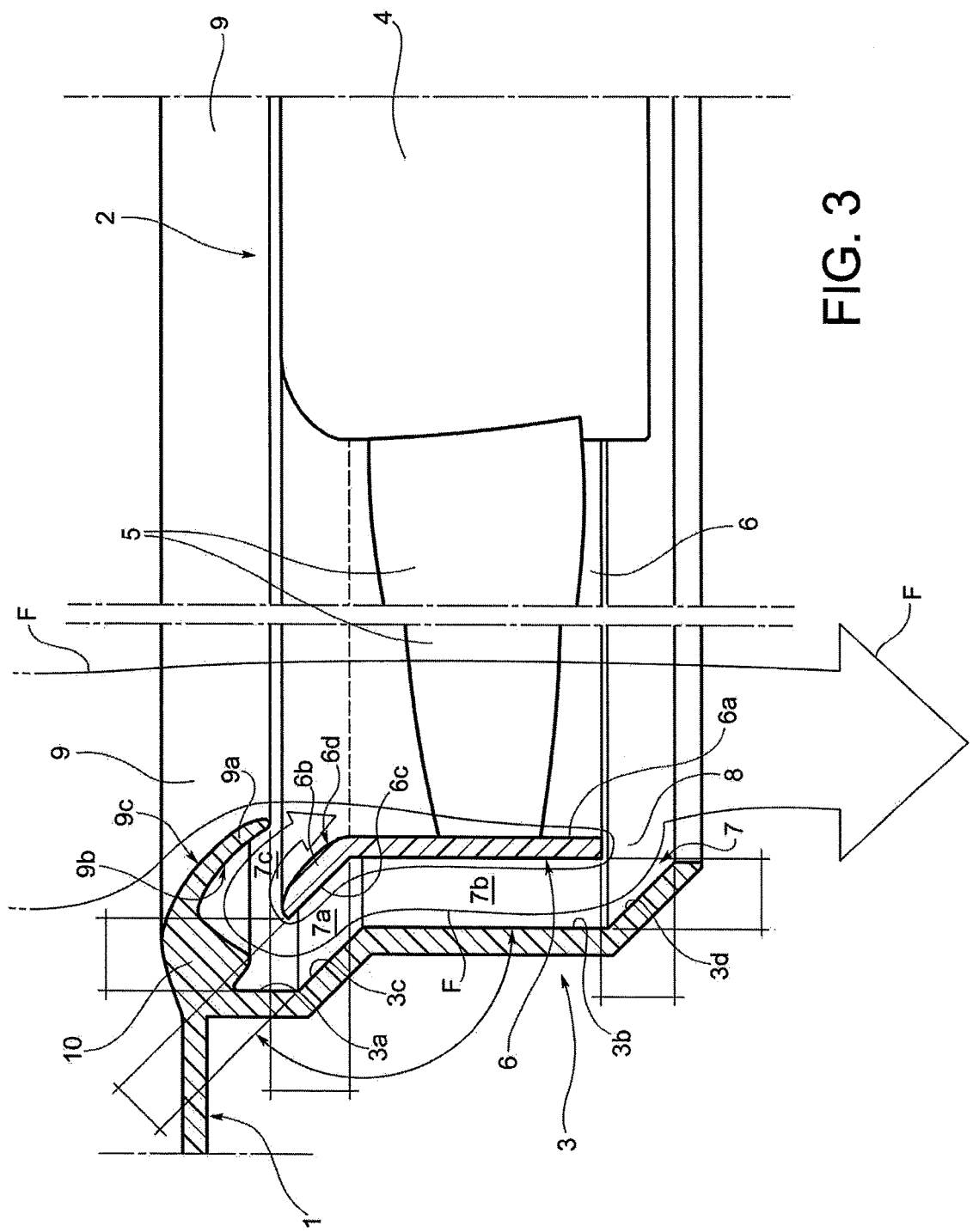
FIG. 3 is an enlarged view of a part of FIG. 2.

In FIGS. 2 and 3, where the preferred embodiment of the present invention is shown, parts and elements already described have been assigned the same reference numbers and letters used previously.

The ventilation assembly shown in FIGS. 2 and 3 also comprises a support structure or cowl 1 which is made of molded plastic and defines a conduit 3 inside which there is rotatably mounted an impeller 2 driven, in a manner known per se and not described, by an electric motor, such as a DC motor with or without brushes.

The impeller 2 has a central hub 4 from which there extends a plurality of blades 5, the radially outer ends of which are connected to the cylindrical main portion 6a of a peripheral ring 6 which at one end forms an outwardly diverging lip 6b. The lip 6b has a substantially frusto-conical shape, with an angle of inclination a (angle of divergence from the axis) between 115° and 145°.

The conduit 3 defined by the cowl 1 has first and second axial portions 3a and 3b which are essentially cylindrical and have larger and smaller cross-sections, respectively. These portions 3a and 3b of the conduit 3 are interconnected by an intermediate joining portion 3c which also has a substantially frusto-conical shape, with an inclination angle at least approximately corresponding to that of the lip 6b of the peripheral ring 6 of the impeller 2. The joining portion 3c of the conduit 3 in particular faces and is at least approximately parallel to the outer surface of the lip 6b.

As can be seen more clearly in FIG. 3, an annular passage, denoted overall by 7, is formed between the peripheral ring 6 of the impeller 2 and the wall of the conduit 3. This passage 7 comprises a first portion 7a, defined between the lip 6b of the ring 6 and the joining portion 3c of the wall of the conduit 3. This portion 7a of the annular passage 7 extends in a direction forming an angle relative to the axis of the ventilation assembly and therefore having a radial component. The passage 7 also comprises an essentially axial second portion 7b defined between the cylindrical part 6a of the ring 6 and the portion 3b of the wall of the conduit 3.

In the embodiment shown, the wall of the conduit 3 has a further portion 3d which is joined to the portion 3b on the opposite side to the portions 3a and 3c. This third portion 3d extends axially beyond the peripheral ring 6 of the impeller 2 and also has a substantially frusto-conical shape converging away from the impeller 2. The portion 3d of the wall of the conduit 3 has an inclination angle which also at least approximately corresponds to that of the joining portion 3c and the lip 6b of the ring 6.

An annular inlet passage, indicated by 8 in FIG. 3, is defined between the distal rim of the wall portion 3d and the bottom edge of the cylindrical portion 6a of the ring 6.

In the embodiment shown in FIGS. 2 and 3, an anti-recirculation ring 9 is associated with the support structure or cowl 1. This ring 9 extends at the top end of the first portion 7a of the annular passage 7, on the opposite side to the second portion 7b of the annular passage 7. The anti-recirculation ring 9 has a distal portion 9a facing the lip 6b of the peripheral ring 6 of the impeller 2. This portion 9a of the ring 9 has an at least approximately frusto-conical shape converging towards the impeller 2, with an angle of inclination which on average corresponds at least approximately to that of the aforesaid lip 6b.

The lip 6b of the peripheral ring 6 of the impeller 2 has a frusto-conical outer surface 6c having an essentially linear profile, and an inner surface 6d having a convex profile, in particular a parabolic profile (FIG. 3).

The anti-recirculation ring 9 has conveniently a concave, preferably parabolic, inner surface 9b and a convex, also preferably parabolic, outer surface 9c. A further portion 7c of the passage 7 is defined between the inner surface 6d of the lip 6b of the ring 6 and the inner surface 9b of the anti-recirculation ring 9.

Inside the annular passage 7, from the joining zone between the anti-recirculation ring 9 and the first portion 3a of the conduit 3, an annular projection 10 extends towards the lip 6b of the peripheral ring 6 of the impeller 2. The annular projection 10 creates a local narrowing in the annular passage, relative to the distal edge of the lip 6b.

Although in FIGS. 2 and 3 the anti-recirculation ring 9 and the annular projection 10 are shown formed as one piece with the support structure or cowl 1, they may be conveniently formed as a component separate from the support structure or cowl, so as to simplify the associated molding operations, in particular avoiding the need to produce undercut parts.

During operation, rotation of the impeller 2 causes the induction of an air flow though the conduit 3 of the cowl 1, as indicated by the flow lines shown in broken lines in FIG. 3. Most of this flow crosses the anti-recirculation lip 9 and passes between the peripheral ring 6 and the hub 4 of the impeller 2.

A small fraction of the induced air flow recirculates around the peripheral ring 6 of the impeller 2, as indicated by the flow line F in FIG. 3. This flow penetrates into the annular passage 7 through the opening 8, the portions 7b, 7a, and then the portion 7c of this passage.

With the ventilation assembly according to the invention, realized as described above, it is possible to reduce to a minimum air flow through the annular passage defined between the peripheral ring of the impeller and the wall of the conduit of the cowl. It is also possible to reduce the size of the gaps between the peripheral ring of the impeller, the conduit wall of the cowl and the anti-recirculation ring.

It should be understood that the support structure or cowl refers to a cowl or to a support structure which functions as a cowl so as to direct air flow through the conduit. The cowl may also act as a support structure, for example, to support the fan.

Obviously, without altering the principle of the invention, the embodiments and the constructional details may be greatly varied with respect to that described and illustrated purely by way of a non-limiting example, without thereby departing from the scope of the invention as defined in the accompanying claims.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:
1. A ventilation assembly, comprising:
a support structure or cowl in which there is defined a conduit having at least first and second axial portions with a larger and a smaller inner diameter, respectively, interconnected by an intermediate joining portion; and
a motor-driven fan including an impeller mounted rotatable in said conduit and comprising a plurality of blades which extend between a central hub and a peripheral ring,
wherein said peripheral ring has an essentially cylindrical main portion to which the radially outer ends of the blades are connected and to which an outwardly diverging end lip is joined,
wherein, between the peripheral ring of the impeller and the conduit of the support structure or cowl, there is an annular passage comprising a first portion which extends in a direction having a radial component, defined between the outwardly diverging end lip of the peripheral ring of the impeller and the intermediate joining portion of the conduit, and an essentially axial second portion defined between the cylindrical portion of the ring of the impeller and the second axial portion of the conduit,
wherein the outwardly diverging end lip of the peripheral ring of the impeller has a substantially frusto-conical shape,
wherein the intermediate joining portion of the conduit has a substantially frusto-conical shape, and
wherein the conduit has a third portion which extends in a direction angled with respect to the second axial portion of the conduit; and a distal rim of the third portion is lower than a bottom of the essentially cylindrical main portion in an axial direction of the peripheral ring, so that there is an inlet passage formed between the third portion and the bottom of the essentially cylindrical main portion.
2. The ventilation assembly of claim 1, wherein the outwardly diverging end lip of the impeller has a frusto-conical outer surface having a linear profile, and an inner surface having a convex profile.
3. The ventilation assembly of claim 2, wherein the convex profile of the inner surface is a parabolic profile.
4. The ventilation assembly of claim 1, wherein the third portion of the conduit extending axially beyond the peripheral ring of the impeller and having a substantially frusto-conical shape which converges toward a side away from the impeller and has an angle of inclination which substantially corresponds to that of the intermediate joining portion of the conduit.
5. The ventilation assembly of claim 1, wherein the support structure or cowl has an associated anti-recirculation ring which extends at an end of the first axial portion of the conduit opposite to the second axial portion of the conduit and faces the outwardly diverging end lip of the impeller; the anti-recirculation ring having a substantially frusto-conical shape converging toward the impeller with an angle of inclination which on average corresponds to that of the outwardly diverging end lip.
6. The ventilation assembly of claim 5, wherein the anti-recirculation ring has an outer surface having a convex profile, and an inner surface having a concave profile.

7. The ventilation assembly of claim 6, wherein the convex profile of the outer surface of the anti-recirculation ring is parabolic.
8. The ventilation assembly of claim 6, wherein concave profile of the inner surface of the anti-recirculation ring is parabolic.
9. The ventilation assembly of claim 6, wherein in said annular passage there is provided an annular projection, which extends from a joining zone between the anti-recirculation ring and the first axial portion of the conduit, towards the outwardly diverging end lip of the peripheral ring of the impeller, defining a local narrowing in said annular passage.
10. A ventilation assembly, comprising:
a support structure or cowl in which there is defined a conduit, the conduit having at least a first axial portion with a larger inner diameter than and a second axial portion with a smaller inner diameter, the first axial portion and the second axial portion interconnected by an intermediate joining portion; and
a motor-driven fan including an impeller mounted rotatable in said conduit and comprising a plurality of blades which extend between a central hub and a peripheral ring,
wherein said peripheral ring has an essentially cylindrical main portion to which the radially outer ends of the blades are connected and to which an outwardly diverging end lip is joined,
wherein the conduit has a third portion which extends from the second axial portion of the conduit in a direction angled with respect to the second axial portion of the conduit, and
wherein a distal rim of the third portion is lower than a bottom of the essentially cylindrical main portion in an axial direction of the peripheral ring, so that there is an inlet passage formed between the third portion and the bottom of the essentially cylindrical main portion.
11. The ventilation assembly of claim 10, wherein the third portion of the conduit extending axially beyond the peripheral ring of the impeller and having a substantially frusto-conical shape which converges toward a side away from the impeller and has an angle of inclination which substantially corresponds to that of the intermediate joining portion of the conduit.
12. The ventilation assembly of claim 10, wherein the outwardly diverging end lip of the peripheral ring of the impeller has a substantially frusto-conical shape with an inclination angle diverging from an axis of the peripheral ring, and the inclination angle is between 115° and 145°.
13. A ventilation assembly, comprising:
a support structure or cowl in which there is defined a conduit having at least first and second axial portions with a larger and a smaller inner diameter, respectively, interconnected by an intermediate joining portion; and
a motor-driven fan including an impeller mounted rotatable in said conduit and comprising a plurality of blades which extend between a central hub and a peripheral ring,
wherein said peripheral ring has an essentially cylindrical main portion to which the radially outer ends of the blades are connected and to which an outwardly diverging end lip is joined,
wherein, between the peripheral ring of the impeller and the conduit of the support structure or cowl, there is an annular passage comprising a first portion which extends in a direction having a radial component, defined between the lip of the peripheral ring of the impeller and the joining portion of the conduit, and an essentially axial second portion defined between the cylindrical portion of the peripheral ring of the impeller and the second axial portion of the conduit, wherein the support structure or cowl has an associated anti-recirculation ring at a side of the conduit opposite to the second axial portion of the conduit, the anti-recirculation ring and the outwardly diverging end lip of the peripheral ring being overlapped in an axial direction of the peripheral ring, wherein the annular passage further comprises a third portion defined between the anti-recirculation ring and the lip of the peripheral ring, and wherein the anti-recirculation ring has a thickened portion at a corner of the first portion of the annular passage and the third portion of the annular passage to define a local narrowing in the annular passage.

14. The ventilation assembly of claim 13, wherein the thickened portion has an annular projection, which extends from a joining zone between the anti-recirculation ring and the first axial portion of the conduit, towards the outwardly diverging end lip of the peripheral ring.

* * * * *